March 29, 1960 G. T. FELBECK 2,930,498
SILO UNLOADING APPARATUS AND PROCESS
Filed Oct. 28, 1954

INVENTOR
GEORGE T. FELBECK
BY
Barnwell R. King
ATTORNEY

United States Patent Office 2,930,498
Patented Mar. 29, 1960

2,930,498

SILO UNLOADING APPARATUS AND PROCESS

George T. Felbeck, Wernersville, Pa.

Application October 28, 1954, Serial No. 465,248

8 Claims. (Cl. 214—17)

This invention relates to silo unloading.

According to the invention there is provided a novel method of unloading silage from a silo, which comprises boring into such silage through a silage discharge port in the wall of such silo adjacent the bottom thereof with an elongated auger. In the case of packed silage the resulting silage cuttings are removed through such port by reciprocating such auger longitudinally of itself during the boring operation.

The invention also involves a novel process of unloading silage from a silo, which comprises boring into such silage through a silage discharge port in the wall of such silo adjacent the bottom thereof with an elongated auger composed of a screw having suitably projecting silage cutting teeth. In the case of loose silage the resulting cuttings are removed from the silo with said auger through such port by swinging the rotating auger laterally within such silo about a vertical axis suitably located outside of said wall, for example.

Further, according to the invention there is provided a unique device for removing silage from a silo which comprises an auger mounted for selective movement in a substantially horizontal plane into and out of a silage discharge port, as well as laterally about a suitable located vertical axis. There is also provided for use in combination therewith downwardly and inwardly inclined means located within the silo for guiding the silage toward the lateral angular limits of travel of said auger therein, so that practically all of the silage can be unloaded therewith.

Important features of my invention include the following: All moving parts of the unloader except those involved in the rotation and driving of the auger are located outside the silo where they can be observed and serviced with relative ease. Lubricating material used with the device does not come in contact with or mix with the silage. The device can be used to unload green or packed silage. The auger can be withdrawn from the silage and cleaned whenever necessary or desirable. The device is relatively foolproof and operates to unload silage with equal ease whether the silage is green and packed, or dry and loose. Furthermore, the device is simple and economical in its parts, can be installed, operated and maintained by unskilled labor without difficulty, and is efficient and effective in operation.

Figure 1:
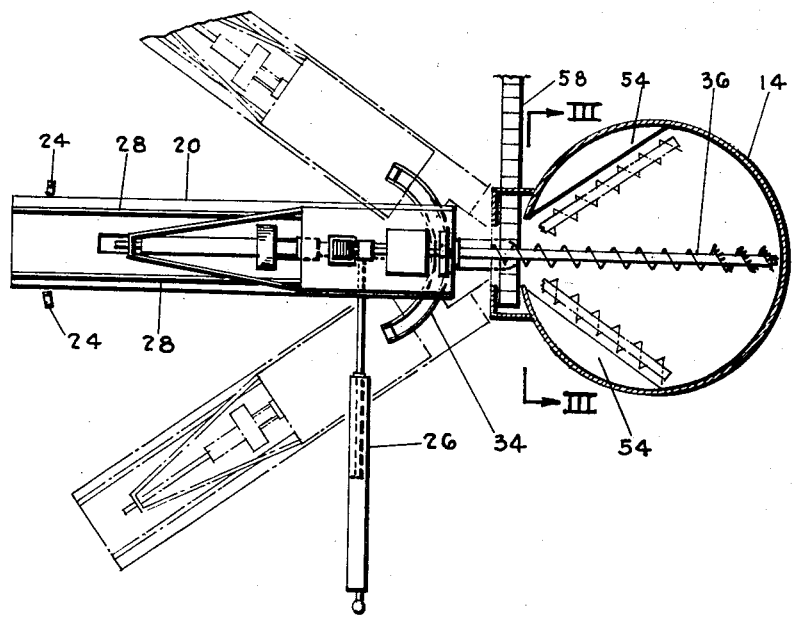
Fig. 1 is a view mainly in top plan of a device embodying the invention.
Figure 2:
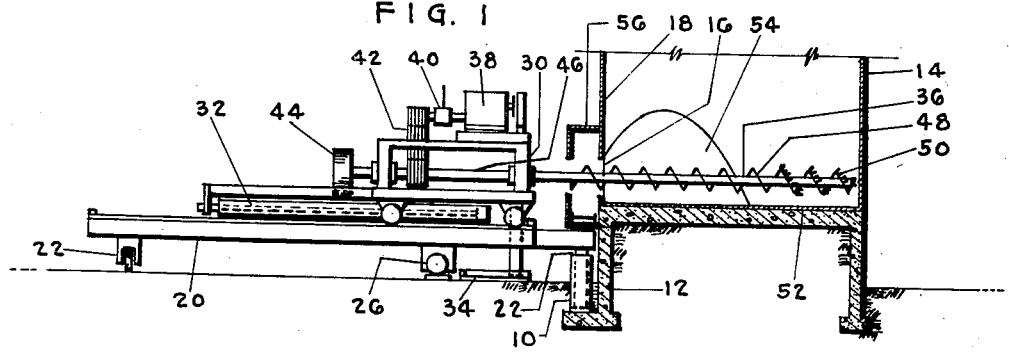
Fig. 2 is a view mainly in side elevation, the bottom of the silo being shown in cross-section.
Figure 3:
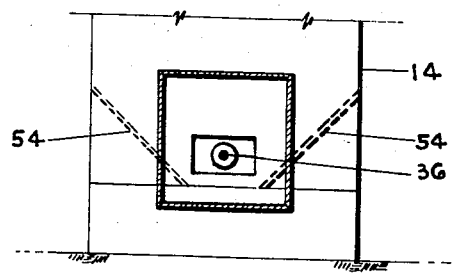
Fig. 3 is a fragmentary view in cross-section of the silo, taken on line III—III of Fig. 1.

As shown in such drawing an upright socket 10 is mounted adjacent the base 12 of a silo 14 under the center of a silage discharge port 16 in the side wall 18 of such silo. An elongated platform 20 is supported at one end by a vertical axle 22 fitting said socket 10, so that the platform can be swung laterally in a horizontal plane about the vertical axis of such socket. The other end of the platform is supported by suitable wheels 24. The platform may be adjusted or swung laterally by suitable power means such as a hydraulic cylinder motor 26.

Mounted on the platform 20 is a track consisting of parallel rails 28 on which a carriage 30 is adapted to run longitudinally. The carriage 30 is driven by any suitable means such as a hydraulic piston-cylinder 32, one end of which is connected to the carriage and the other to the platform. Movement of the carriage 30 toward the silo 14 is limited by an arcuate stop 34 to prevent an auger 36 the shank of which is rotatably mounted on the carriage 30, from damaging the wall of the silo by coming in contact therewith.

The auger is driven by a motor 38 that is mounted on the carriage 30, through a reversing gear 40 and a belt 42. An annular counter-weight 44 is mounted on the rear end of the auger shank 46. The screw 48 of the auger is provided with forwardly and outwardly projecting teeth 50 for keeping the auger from binding in green silage. The floor 52 of the silo 14 is located just below the path of the auger 36, and downwardly and inwardly inclined panels 54 are mounted on such floor in the silo 14 for guiding the silage toward the lateral limits of swinging movement of the auger 36 with the carriage when the platform 20 is swung about the vertical axis provided by the socket 10 and axle 22.

The auger 36 is adapted to project through the silage discharge port 16, as shown, and the latter is provided with a box 56 mounted on the outside of the silo wall, through which a silage conveyor 58 passes longitudinally for transporting silage discharged from the silo interior by operation of the auger 36.

In unloading packed silage the auger 36 is rotated at a suitable speed and driven in and out of the same by running the carriage 30 back and forth on the track and changing the angular position of the platform 20 between boring strokes of the auger. If the silage is loose enough, the auger 36 is merely swung laterally within the silo 14 while operating the screw 48 in which case the forwardly and outwardly projecting teeth 50 thereon are effective to keep the device from binding.

I claim:

1. The method of unloading silage from a silo, which comprises boring into such silage through a silage discharge port in the wall of such silo adjacent the bottom thereof with an elongated auger, removing the resulting silage cuttings through such port by laterally translating and reciprocating such auger longitudinally of itself during the boring operation.

2. The method of unloading silage from a silo, which comprises boring into such silage through a silage discharge port in the wall of such silo adjacent the bottom thereof with an elongated auger composed of a screw having forwardly and outwardly projecting silage cutting teeth, and removing silage from the silo with said auger through such port by rotating, reciprocating and laterally translating such auger in such silage.

3. The method of unloading silage as defined by claim 3, including the steps of swinging the rotating auger laterally within such silo about a vertical axis located outside of said wall.

4. A silo unloader comprising, in combination, a horizontally disposed track mounted to swing laterally about a vertical axis located adjacent the outer side of a silo, a carriage adapted to move on said track toward and away from such silo, an auger mounted on said carriage for movement therewith, said auger projecting horizontally from said carriage for operation through a silage discharge port in the wall of such silo, means including a motor for rotating said auger about its longitudinal axis, means for driving said auger carrying carriage on said track, and means for swinging said track laterally about such vertical axis, said auger thus being adapted to enter the silo through said port for the purpose of withdrawing silage therethrough from within the silo at any angle within the limits of lateral movement of said track about such vertical axis, the extent of movement of the carriage on the track being such that the forward cutting end of said auger can be withdrawn entirely from the silo for redirection thereof by shifting the track about such axis, and also such that the auger can be reciprocated longitudinally, while rotating, into and out of the silo for the purpose of removing packed silage therefrom.

5. A silo unloader as defined by claim 4, including inclined guide means within the silo for directing silage therein inwardly and downwardly toward the lateral limits of movement of said auger therein, and a horizontal support for such silage located just under the area of action of said auger within the silo, whereby practically all of the silage can be unloaded from the silo by means of said auger.

6. A silo unloader as defined by claim 4, in which the auger comprises a screw provided with projecting teeth for preventing binding of the auger in use.

7. A silo unloader as defined by claim 4, which includes in the combination a silage conveyor located under such silage discharge port for transporting the silage transversely therefrom.

8. Silo silage unloading process which comprises, in combination, the steps of boring into the silage through a silage discharge port in the wall of a silo near the bottom of the silo with an elongated auger; simultaneously reciprocating such auger at a selected one of several speeds parallel to its axis while it is being rotated in the silage; and swinging the so-rotating and reciprocating auger laterally within the silo about a vertical axis located outside of the silo wall; said auger being completely removable from the silo at will.

References Cited in the file of this patent

UNITED STATES PATENTS

| | | |
|---|---|---|
| 1,145,927 | Shorten | July 13, 1915 |
| 1,165,760 | Craine | Dec. 28, 1915 |
| 1,570,085 | Saxe | Jan. 19, 1926 |
| 1,954,703 | Klein | Apr. 10, 1934 |
| 1,971,716 | Hitchcock | Aug. 28, 1934 |
| 2,505,194 | Loss | Apr. 25, 1950 |
| 2,529,583 | Adams | Nov. 14, 1950 |
| 2,562,427 | Hurter | July 31, 1951 |
| 2,571,277 | Morrow | Oct. 16, 1951 |
| 2,601,049 | Neighbour | June 17, 1952 |
| 2,736,461 | Dueringer et al. | Feb. 28, 1956 |